United States Patent
Kim et al.

(10) Patent No.: US 9,219,401 B2
(45) Date of Patent: Dec. 22, 2015

(54) VIBRATOR AND ELECTRONIC DEVICE INCLUDING THE SAME

(71) Applicant: SAMSUNG ELECTRO-MECHANICS CO., LTD., Suwon (KR)

(72) Inventors: Yong Tae Kim, Suwon (KR); Kyung Su Park, Suwon (KR); Jung Taek Hong, Suwon (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 370 days.

(21) Appl. No.: 13/944,417

(22) Filed: Jul. 17, 2013

(65) Prior Publication Data
US 2014/0265651 A1    Sep. 18, 2014

(30) Foreign Application Priority Data
Mar. 15, 2013  (KR) .......................... 10-2013-0028275

(51) Int. Cl.
*H02K 33/00* (2006.01)
*H02K 33/16* (2006.01)

(52) U.S. Cl.
CPC ...................................... *H02K 33/16* (2013.01)

(58) Field of Classification Search
CPC ............................... H02K 33/00; H02K 33/16
USPC ......................................... 310/15, 25, 36–37
See application file for complete search history.

(56) References Cited

U.S. PATENT DOCUMENTS

| | | | | |
|---|---|---|---|---|
| 6,700,251 | B2 * | 3/2004 | Kobayashi | H02K 33/02 310/15 |
| 7,495,358 | B2 * | 2/2009 | Kobayashi | A61C 17/3445 15/22.1 |
| 2003/0142845 | A1 | 7/2003 | Miyamoto et al. | |
| 2004/0104625 | A1 * | 6/2004 | Wakuda | B06B 1/0215 310/15 |
| 2007/0040457 | A1 * | 2/2007 | Shimizu | A61C 17/3445 310/15 |
| 2011/0193427 | A1 * | 8/2011 | Lemieux | F03G 7/08 310/25 |
| 2011/0193428 | A1 * | 8/2011 | Lemieux | H02K 35/02 310/25 |

FOREIGN PATENT DOCUMENTS

JP    2003-220363    8/2003
JP    2011-200752    10/2011

* cited by examiner

*Primary Examiner* — Thanh Lam

(57) ABSTRACT

There are provided a vibrator and an electronic device including the same, the vibrator including a housing having an internal space; a shaft included in the internal space; a vibrating part suspended in the internal space by elastic members at both ends thereof, including a magnetic field part, and having a bearing member slidably and movably installed on the shaft; and a coil generating vibrations of the vibrating part through electromagnetic interaction with the magnetic field part and provided on an outer peripheral surface of the shaft while facing the magnetic field part.

10 Claims, 9 Drawing Sheets

VIBRATOR AND ELECTRONIC DEVICE INCLUDING THE SAME

CROSS-REFERENCE TO RELATED APPLICATIONS

This application claims the priority of Korean Patent Application No. 10-2013-0028275 filed on Mar. 15, 2013, in the Korean Intellectual Property Office, the disclosure of which is incorporated herein by reference.

BACKGROUND OF THE INVENTION

1. Field of the Invention

The present invention relates to a vibrator and an electronic device including the same.

2. Description of the Related Art

A vibrator, a component converting electrical energy into mechanical vibrations through generating electromagnetic force, is mounted in an electronic device such as a mobile phone to be used for silently notifying a user thereof of call reception.

In addition, in accordance with the rapid expansion in the market for electronic devices such as mobile phones, various functions have been added to electronic devices. In a situation in which high quality, miniaturized electronic device components are required, the development of a vibrator having a novel structure in which disadvantages of existing vibrators may be overcome, and the quality thereof significantly improve, has been required.

In recent years, as the release of mobile phones having relatively large liquid crystal display (LCD) screens onto the market has rapidly increased, a touchscreen scheme has been adopted for use therewith, and vibrators have been used in order to generate vibrations when an LCD screen is touched.

In addition, vibrators used in the electronic devices adopting the touchscreen scheme should firstly have an increased operational lifespan, due to the fact that vibrations are generated frequently, rather than vibrations merely generated at the time of call reception, and secondly, vibratory response speeds should be increased, according to speed at which touchscreens are touched.

In accordance with the demand for the above-mentioned increased lifespan and vibratory response speed, linear vibrators have recently been used in electronic devices such as mobile phones including touchscreens.

A linear vibrator does not use a rotational principle of a motor, but is oscillated by electromagnetic force having a resonant frequency determined by using an elastic member installed inside the vibrator and a mass body connected to the elastic member to thereby generate vibrations.

In accordance with the miniaturization of electronic devices, linear vibrators should also be miniaturized. However, there is limitation in miniaturizing linear vibrators, due to components which should be necessarily included therein. Therefore, linear vibrators having a novel structure through an efficient arrangement of components thereof are required.

Further, linear vibrators should be provided with high levels of performance and be able to provide strong vibrations, should have excellent response speeds, and should be stopped immediately after a factor contributing to generation of vibrations is removed. In addition, linear vibrators should have durability, allowing for internal components thereof to be protected from external impacts caused in the case that electronic devices are dropped, or the like. In addition thereto, a high degree of productivity and low manufacturing costs are also required.

However, the linear vibrator according to the related art does not satisfy the above-mentioned requirements.

RELATED ART DOCUMENT (Patent Document 1) Japanese Patent Laid-Open Publication No. 2003-220363 (Aug. 5, 2003)

SUMMARY OF THE INVENTION

An aspect of the present invention provides a linear vibrator reduced in size by efficiently improving an arrangement of internal components.

Another aspect of the present invention provides a linear vibrator having high performance and providing strong vibrations, having excellent vibration response, and immediately stopping vibrations in the case in which a factor contributing to generation of vibrations is removed.

In addition, another aspect of the present invention provides a linear vibrator having a high degree of durability allowing for the protection of internal components from external impacts and satisfying requirements for high levels of productivity and low manufacturing costs.

According to an aspect of the present invention, there is provided a vibrator, including: a housing having an internal space; a shaft included in the internal space; a vibrating part suspended in the internal space by elastic members at both ends thereof, including a magnetic field part, and having a bearing member slidably and movably installed on the shaft; and a coil generating vibrations of the vibrating part through electromagnetic interaction with the magnetic field part and provided on an outer peripheral surface of the shaft while facing the magnetic field part.

The vibrating part may further include a mass body.

The vibrator may further include a vibrating part case enclosing the vibrating part.

The coil may be disposed at one end of the shaft in a length direction thereof, and the magnetic field part may be disposed at one end of the vibrating part so as to be associated with the coil.

The coil may be disposed in the magnetic field part.

The magnetic field part may have an inner diameter greater than an outer diameter of the coil.

At least one end of the coil in the length direction thereof may be provided with a yoke formed of a magnetic material.

The magnetic field part may include a magnet.

At least one end of the magnet in a length direction thereof may be provided with a yoke formed of a magnetic material.

According to another aspect of the present invention, there is provided an electronic device, including: a display module displaying an image according to user selection; a main body case receiving the display module; and a vibrator mounted in the main body case and providing vibrations according to user selection by including a housing having an internal space, a shaft included in the internal space, a vibrating part suspended in the internal space by elastic members at both ends thereof, including a magnetic field part, and having a bearing member slidably and movably installed on the shaft, and a coil generating vibrations of the vibrating part through electromagnetic interaction with the magnetic field part and provided on an outer peripheral surface of the shaft while facing the magnetic field part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
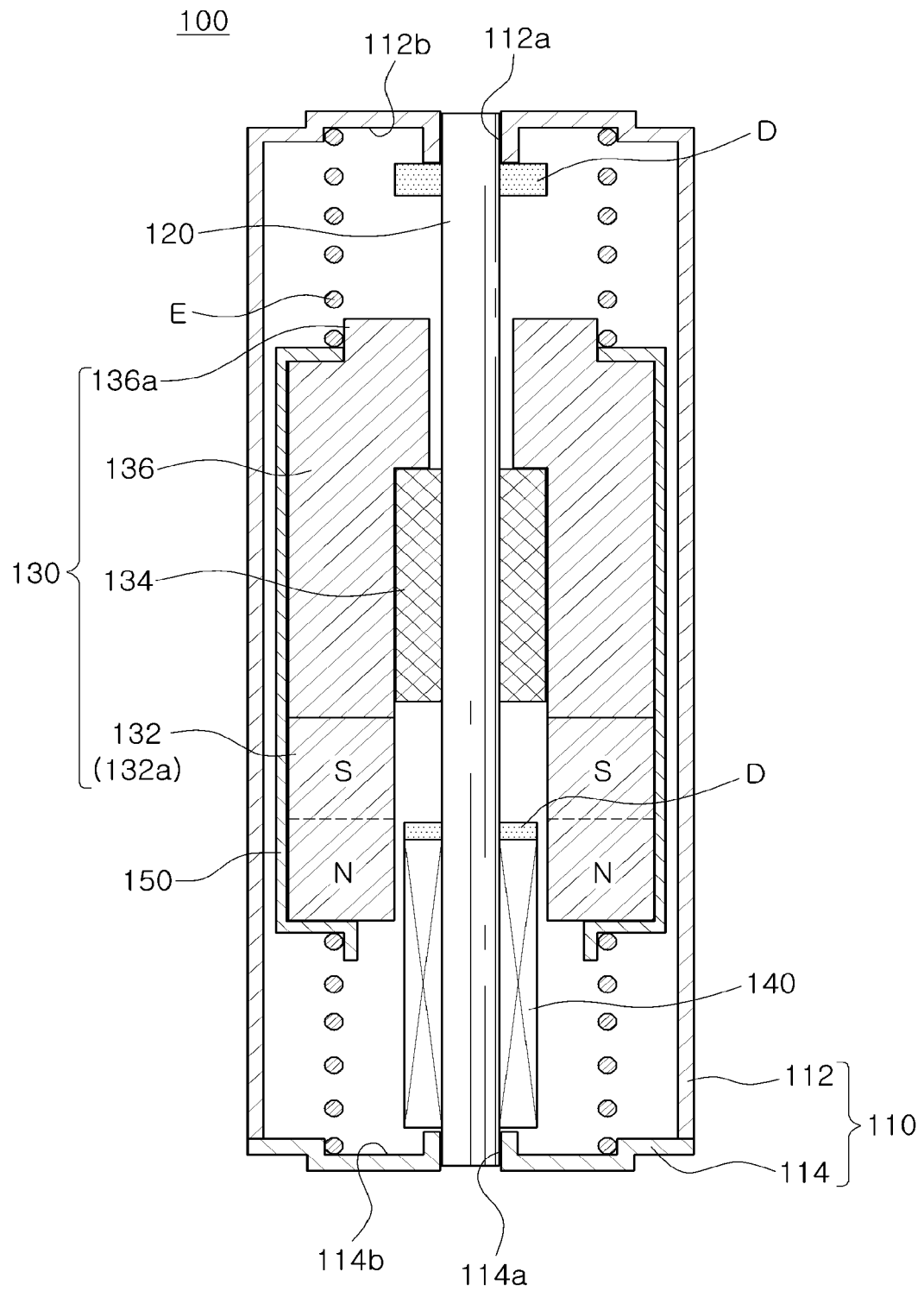
FIG. 1 is a cross-sectional view of a vibrator according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2A:
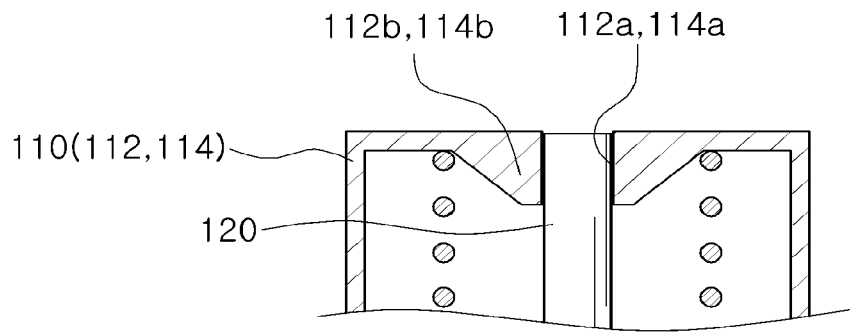
FIGS. 2A through 2C are cross-sectional views showing examples of a guide part included in a housing of the vibrator according to the embodiment of the present invention.
Figure 2B:
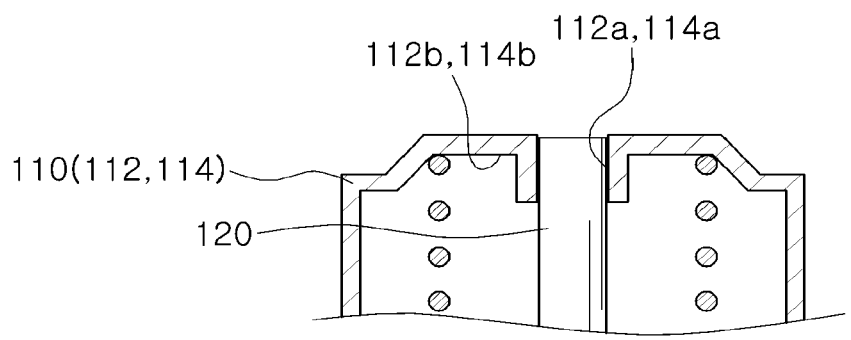
Figure 2C:
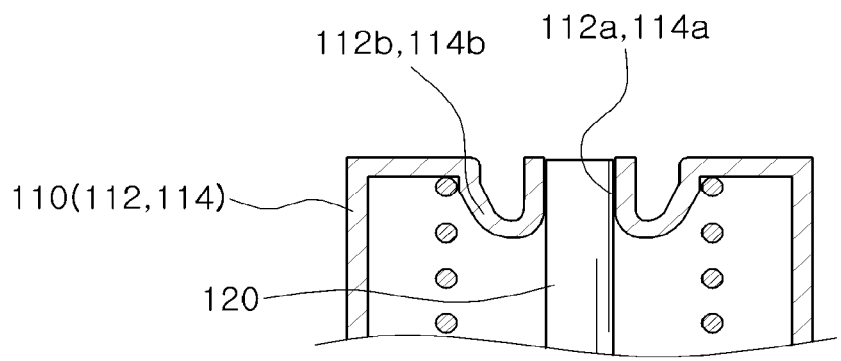
Figure 3:
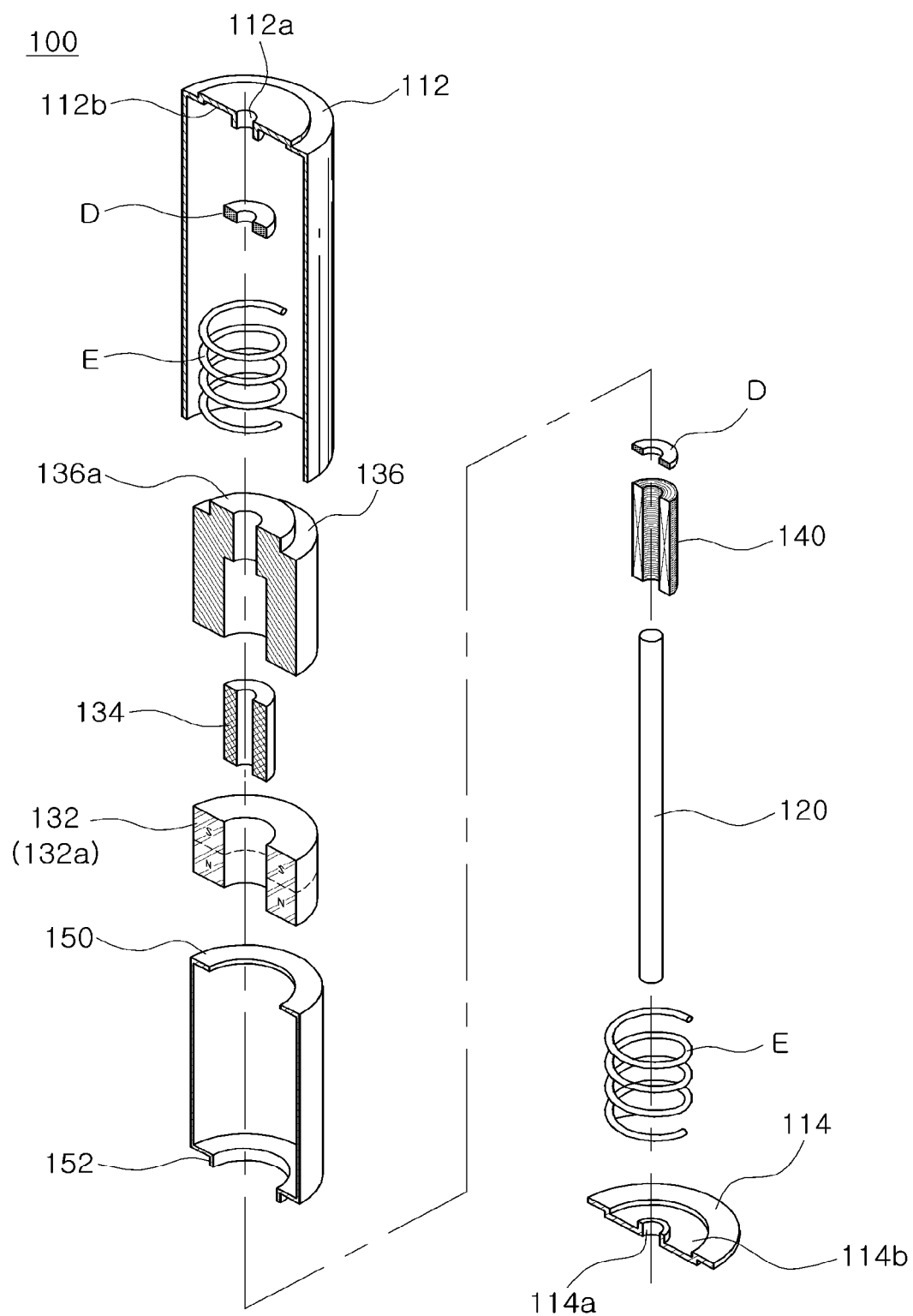
FIG. 3 is a semi-cross-sectional exploded perspective view of the vibrator according to the embodiment of the present invention.
Figure 4A:
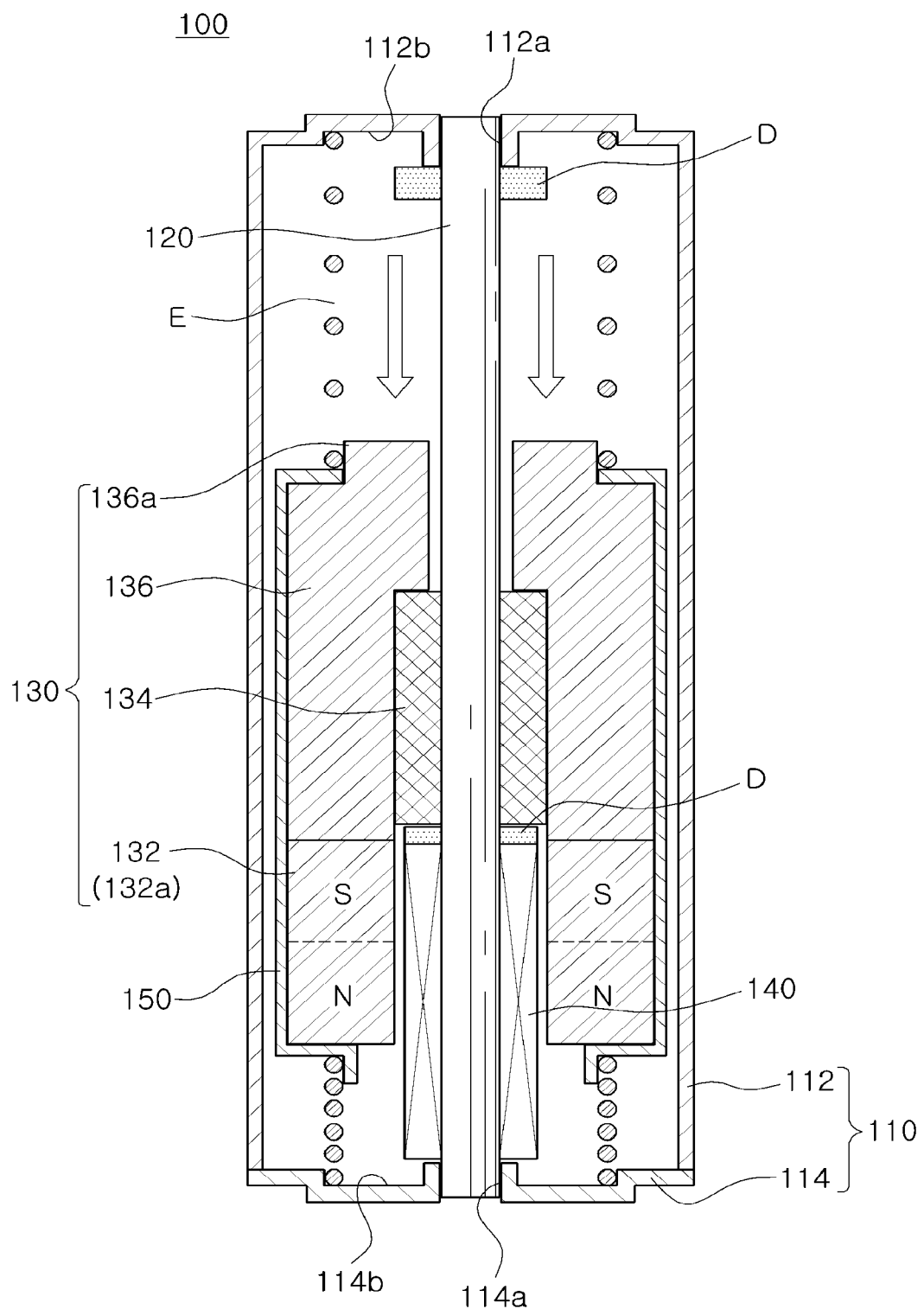
FIGS. 4A and 4B are reference views showing a vibrational state of the vibrator according to the embodiment of the present invention.
Figure 4B:
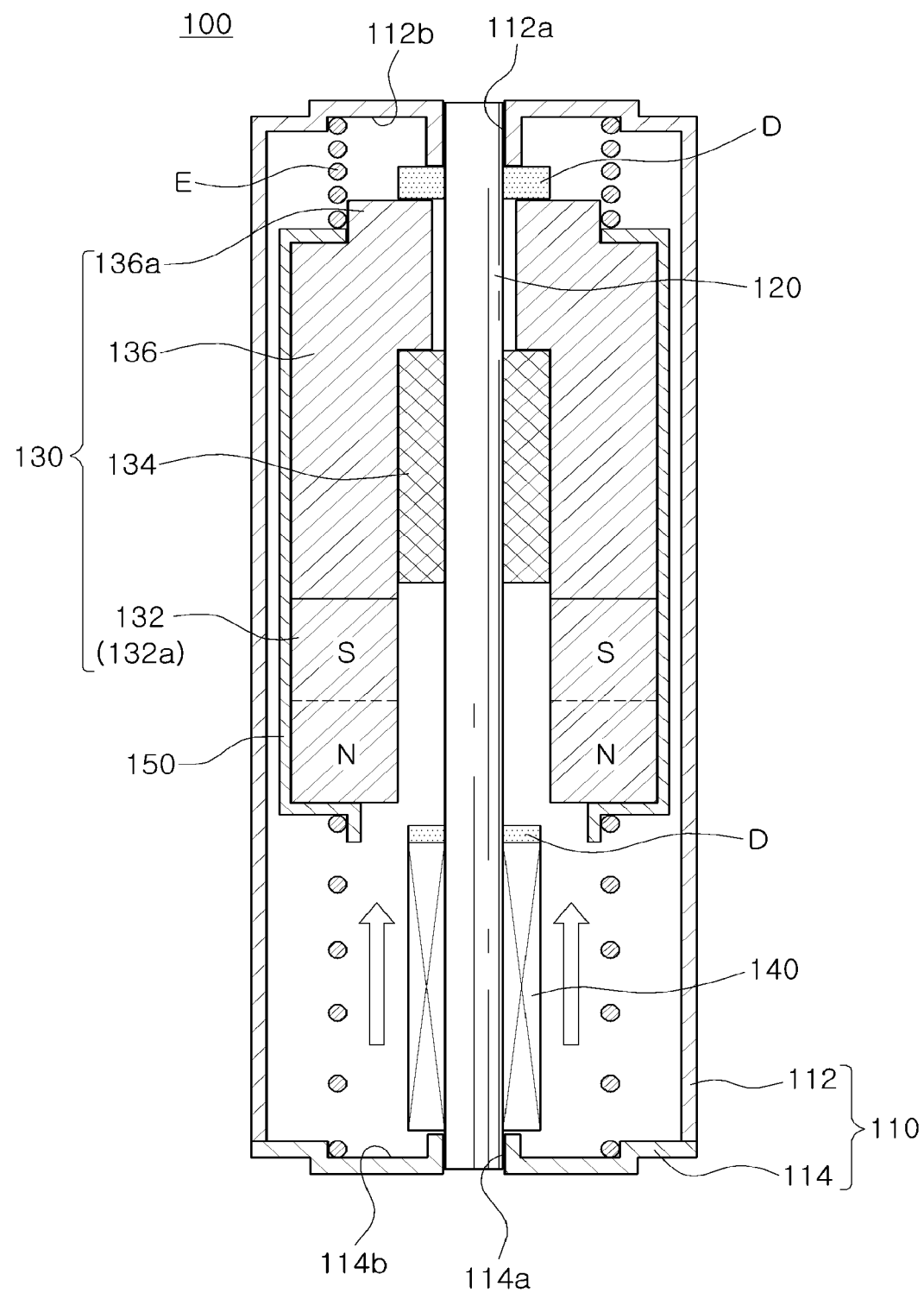

FIG. 1 is a cross-sectional view of a vibrator according to an embodiment of the present invention, FIGS. 2A through 2C are cross-sectional views showing examples of a guide part included in a housing of the vibrator according to the embodiment of the present invention, FIG. 3 is a semi-cross-sectional exploded perspective view of the vibrator according to the embodiment of the present invention, and FIGS. 4A and 4B are reference views showing a vibrational state of the vibrator according to the embodiment of the present invention.

Referring to FIGS. 1 through 4B, a vibrator 100 according to an embodiment of the invention may include a housing 110, a shaft 120, a vibrating part 130, a coil 140, and a vibrating part case 150. The above-mentioned elements are merely exemplary, and some of which may be removed or other elements may be additionally included.

First, terms with respect to directions will be defined. As shown in FIG. 1, a length direction (axial direction) refers to a vertical direction, that is, a direction from one end of the housing 110 toward the other end thereof or a direction from the other end of the housing 110 toward one end thereof, and a radial direction (width direction) refers to a horizontal direction.

In addition, a circumferential direction refers to a direction of rotation along an inner peripheral surface or an outer peripheral surface of a predetermined member, based on a central axis in the length direction.

Meanwhile, a fixed part, with respect to the vibrating part 130, may include the housing 110, the shaft 120, and the coil 140.

The housing 110 has an internal space and forms an outer casing of the vibrator 100. The housing 110 may include a case 112 having one end opened and the internal space, and a bracket 114 coupled to the end of the case 112 to thereby close the internal space of the case 112.

The case 112 is formed of a magnetic material so that a magnetic closed circuit may be formed and magnetic leakage to the outside may be prevented. However, the case 112 is not limited thereto, but may be formed of a non-magnetic material.

The case 112 may be formed by performing plastic working (for example, press processing, or the like) on a steel sheet and may be manufactured in a die-casting scheme using other materials.

In addition, both ends of the housing 110 forming the internal space may be provided with fitting parts 112a and 114a. The fitting parts 112a and 114a may be provided as a groove or a hole. Both ends of the shaft 120 may be fitted into the fitting parts 112a and 114a, respectively, to thereby be fixed thereto.

In addition, both ends of the housing 110 forming the internal space may be provided with guide parts 112b and 114b. The case 112 may be provided with the guide part 112b into which one end portion of an elastic member E is inserted, and the bracket 114 may be provided with the guide part 114b into which the other end portion of the elastic member E is inserted. The guide part 112b of the case 112 may be simply manufactured during the plastic working of the steel sheet or the die-casting of other materials.

The guide parts 112b and 114b may have a groove shape as shown in FIGS. 1 and 3. However, the shape of the guide parts 112b and 114b is not limited thereto. The guide parts 112b and 114b may be formed integrally with the case 112 or the bracket 114 of the housing 110 by forging in order to have a shape of FIG. 2A, may be further protruded outwardly, as compared to the guide parts shown in FIGS. 1 and 3, in order to have a groove shape of FIG. 2B, or may be formed by reverse drawing in order to have a shape of FIG. 2C.

Here, one of both ends of the housing 110 forming the internal space may be provided with a damper D. In the vibrator 100 according to the embodiment of FIGS. 1 through 3, one end of the housing 110 having the fitting part 112a of the case 112 may be provided with the damper D. That is, the damper D may be provided as an impact absorbing member in a case in which the vibrating part 130 contacts the housing 110 during vibrations in the internal space of the housing 110.

The bracket 114 may be formed of a metal material so as to be firmly fixed to the case 112 and may be manufactured by plastic working, die-casting, or the like. However, the method of manufacturing the bracket 114 is not limited thereto, but the bracket 114 may be manufactured through injection molding using synthetic resin.

The shaft 120 may be provided within the internal space of the housing 110 in the length direction. That is, both ends of the shaft 120 may be fitted and fixed to the fitting parts 112a and 114a provided in the housing 110.

The shaft 120 may serve to guide vibrations of the vibrating part 130 in the vibrator 100 according to the embodiment of the invention.

The vibrating part 130 may be suspended in the internal space of the housing 110 with the elastic members E connected to both ends thereof. In addition, the vibrating part 130 may include a magnetic field part 132, a bearing member 134, and a mass body 136.

One ends of the elastic members E are fixed to the ends of the vibrating part 130, respectively, and the other ends thereof are fixed to the ends of the housing 110, such that the elastic member E may additionally provide vibrating force to the vibrating part 130. More particularly, the elastic members E may be fixed to ends of the mass body 136 or ends of the vibrating part case 150.

The elastic member E may form elastic force in the axial direction, and the elastic member E may be a coil spring or a plate spring. However, the elastic member E is not limited thereto, and any elastic member may be used as long as it may secure elastic force in the axial direction.

The elastic member E may be disposed to allow the shaft 120 to penetrate through the center thereof in the length direction. This is to prevent vibrations from being generated in the radial direction in the case in which vibrations in the length direction are generated by the vibrating part 130.

One ends of the elastic members E may be fitted into step fitting parts 136a and 152 provided at respective ends of the mass body 136 and the vibrating part case 150. In addition, the other ends of the elastic members E may be fitted into the guide parts 112b and 114b of the housing 110.

A magnet 132a provided in the magnetic field part 132 electromagnetically interacts with the coil 140, such that vibrational driving force may be generated.

The above-mentioned magnetic field part 132 may be disposed at one end of the vibrating part 130 so as to be associated with the coil 140 disposed at one end of the shaft 120 in the length direction thereof. In addition, the coil 140 may be disposed in the magnetic field part 132. In addition, the magnetic field part 132 may have an inner diameter greater than an outer diameter of the coil 140. Therefore, the magnetic field part 132 may be vibrated while electromagnetically interacting with the coil 140 without being in contact with the coil 140.

To this end, the magnetic field part 132 has a cylindrical shape and a shaft hole, such that the coil 140 may be disposed in the shaft hole of the magnetic field part 132. However, the magnetic field part 132 is not limited to the above-mentioned configuration, but any configuration may be used as long as the coil 140 is disposed within the magnetic field part 132.

Since a weight of the magnetic field part 132 having the magnet 132a is generally greater than that of the coil 140, in the case in which the coil 140 is disposed in the magnetic field part 132, this configuration may be advantageous for increasing a weight of the vibrating part 130. Considering that vibration quantity of the vibrating part 130 is in proportion to the weight of the vibrating part 130, when the weight of the vibrating part 130 is increased, a high level of vibrations may be implemented.

In addition, since the outer diameter of the magnet 132a may be increased to improve performance of the magnet 132a, a high level of performance may be implemented and response performance may be improved.

Meanwhile, the magnet 132a of the magnetic field part 132 may have an N pole and an S pole magnetized on one end and the other end in the length direction, respectively.

Here, the generation of driving force, using the magnet 132a of the magnetic field part 132, will be described.

First, when power is supplied to the coil 140, driving force is generated through electromagnetic interaction between the coil 140 and the magnet 132a. In this case, an alternating current is supplied to the coil 140. Therefore, driving force generated by the coil 140 and the magnet 132a is alternately generated toward one end and toward the other end in the length direction. Therefore, the magnet 132a may be vibrated in the axial direction.

The bearing member 134 may be slidably and movably installed on the shaft 120. That is, the bearing member 134 may move in the length direction, that is, the vertical direction of FIG. 1 along the shaft 120 by the interaction between the magnet 132a of the magnetic field part 132 and the coil 140.

To this end, the bearing member 134 may have a cylindrical shape. In addition, the bearing member 134 may have a circular through-hole formed in an inner peripheral surface thereof so that it may slidably move along an outer peripheral surface of the shaft 120.

The bearing member 134 may be mounted on an inner peripheral surface of the mass body 136 in an approximately central position in the length direction. Therefore, the mass body 136 may be spaced apart from the shaft 120 by a predetermined distance and the bearing member 134 may be stably fixed.

In addition, since only one bearing member 134 allows the vibrating part 130 to be vibrated within the housing 110 in the length direction, the number of components is decreased, whereby productivity of the vibrator 100 may be increased and manufacturing costs may be reduced.

The bearing member 134 may be manufactured by sintering bearing, injection bearing, or the like, using various copper-based materials.

The mass body 136 may be provided in the vibrating part 130. One end of the mass body 136 may be in contact with, or coupled to, one end of the magnet 132a. However, the mass body 136 may be in contact with or coupled to the magnet 132a in another configuration.

In addition, the bearing member 134 may be coupled to the mass body 136. To this end, the mass body 136 has a through-hole, such that the bearing member 134 may be fitted into the through-hole of the mass body 136. That is, the mass body 136 may be mounted on an outer peripheral surface of the bearing member 134.

The mass body 136 serves to increase vibrations in the case in which driving force is generated by the electromagnetic interaction between the magnet 132a of the magnetic field part 132 and the coil 140. To this end, the mass body 136 may be formed of a material having a high specific gravity. The mass body 136 may be formed of a non-magnetic material, for example, tungsten or a copper-based material such as brass or the like.

The coil 140 may generate vibrations in the vibrating part 130 by electromagnetically interacting with the magnetic filed part 132, that is, the magnet 132a of the magnetic field part 132. To this end, the coil 140 may be fitted into the outer peripheral surface of the shaft 120 so as to face the magnetic field part 132.

When the coil 140 is fitted into the outer peripheral surface of the shaft 120 so as to face the magnetic field part 132, an interval between the coil 140 and the magnet 132a of the magnetic field part 132 may be decreased. Therefore, high performance may be implemented in the vibrator 100.

The coil 140 may be fitted into the outer peripheral surface of the shaft 120 after being separately wound using a self bonding wire. That is, the wire is wound around an outer peripheral surface of a winding jig to thereby form the coil 140 having a cylindrical shape.

In this case, an inner diameter of the coil 140 has a constant dimension, but an outer diameter thereof has a large degree of deviation according to a degree of precision of winding. Therefore, the case of installing the coil 140 on the outer peripheral surface of the shaft 120 using the inner peripheral surface of the coil 140 has a smaller dimensional deviation than the case of installing the coil 140 on the inner peripheral surface of the housing 110 using the outer peripheral surface of the coil 140, thereby having a high degree of dimensional precision. That is, the degree of precision may be increased.

In addition, in the case in which the coil 140 is installed on the inner peripheral surface of the housing 110 using the outer peripheral surface of the coil 140, it is difficult to solder a start line of the coil 140. However, in the case in which the coil 140 is installed on the outer peripheral surface of the shaft 120 using the inner peripheral surface of the coil 140, for example, a printed circuit board may be fixed to the bracket 114 of the housing 110 and the start line of the coil 140 may be soldered. Therefore, productivity may be improved.

The coil 140 may be directly wound around the outer peripheral surface of the shaft 120, in addition to the self bonding wire. In the case in which the coil 140 is directly wound around the outer peripheral surface of the shaft 120, the outer peripheral surface of the shaft 120 may be provided with winding recesses.

The coil 140 may be disposed at one end of the shaft 120 in the length direction thereof. Thereby, the magnetic field part 132 interacting with the coil 140 may also be disposed at one end of the vibrating part 130. The volume of the mass body 136 may be increased so as to maximally occupy internal space of the housing 110 in which the magnetic field part 132 is not disposed, such that vibration performance may be improved. That is, the higher level of vibrations may be implemented by increasing the weight of the mass body 136.

In addition, such a configuration may enable the vibrator 100 to be miniaturized.

Meanwhile, although not shown, the coil 140 may be connected to a power supply unit, for example, the printed circuit board, connected to an external power line. However, as examples of the power supply unit, a lead wire or a spring contact, in addition to the printed circuit board, may be added and other power supply units may be used.

The vibrating part case 150 may enclose the vibrating part 130. Therefore, the components of the vibrating part 130 such as the magnetic field part 132, the bearing member 134, and the mass body 136 may be protected from external impacts such as dropping, or the like. Therefore, the durability of the vibrator 100 may be improved.

The vibrating part case 150 may have one end closed and the other end opened. In addition, the mass body 136, the bearing member 134, and the magnetic field part 132 may be sequentially inserted through the open end of the vibrating part case 150. Thereafter, the open end of the vibrating part case 150 may be closed and firmly fixed using caulking, curling, or the like. By the above-mentioned configuration, the productivity of the vibrator 100 may be improved.

The vibrating part case 150 may be formed of a non-magnetic material so as not to interrupt magnetic flux of the coil 140. However, the material of the vibrating part case 150 is not limited thereto, but the vibrating part case 150 may be formed of a magnetic material.

The vibrating part case 150 may be formed by performing plastic working (for example, press processing, or the like) on a steel sheet and may be manufactured by a die-casting scheme using other materials.

A vibrational state of the vibrator 100 according to the embodiment of the invention will be described with reference to FIGS. 4A and 4B.

Referring to FIG. 4A, the vibrating part 130 of the vibrator 100 generates driving force through the interaction between the coil 140 and the magnetic 132a of the magnetic field part 132 as current is supplied to the coil 140 through the power supply unit. For example, driving force is generated downwardly in the length direction, such that the vibrating part 130 may first move downwardly in the length direction while not moving in the radial direction.

Next, referring to FIG. 4B, when a direction of current supplied to the coil 140 is changed, a direction of driving force is changed. That is, driving force is generated upwardly in the length direction, such that the vibrating part 130 may move upwardly in the length direction while not moving in the radial direction.

Figure 5:
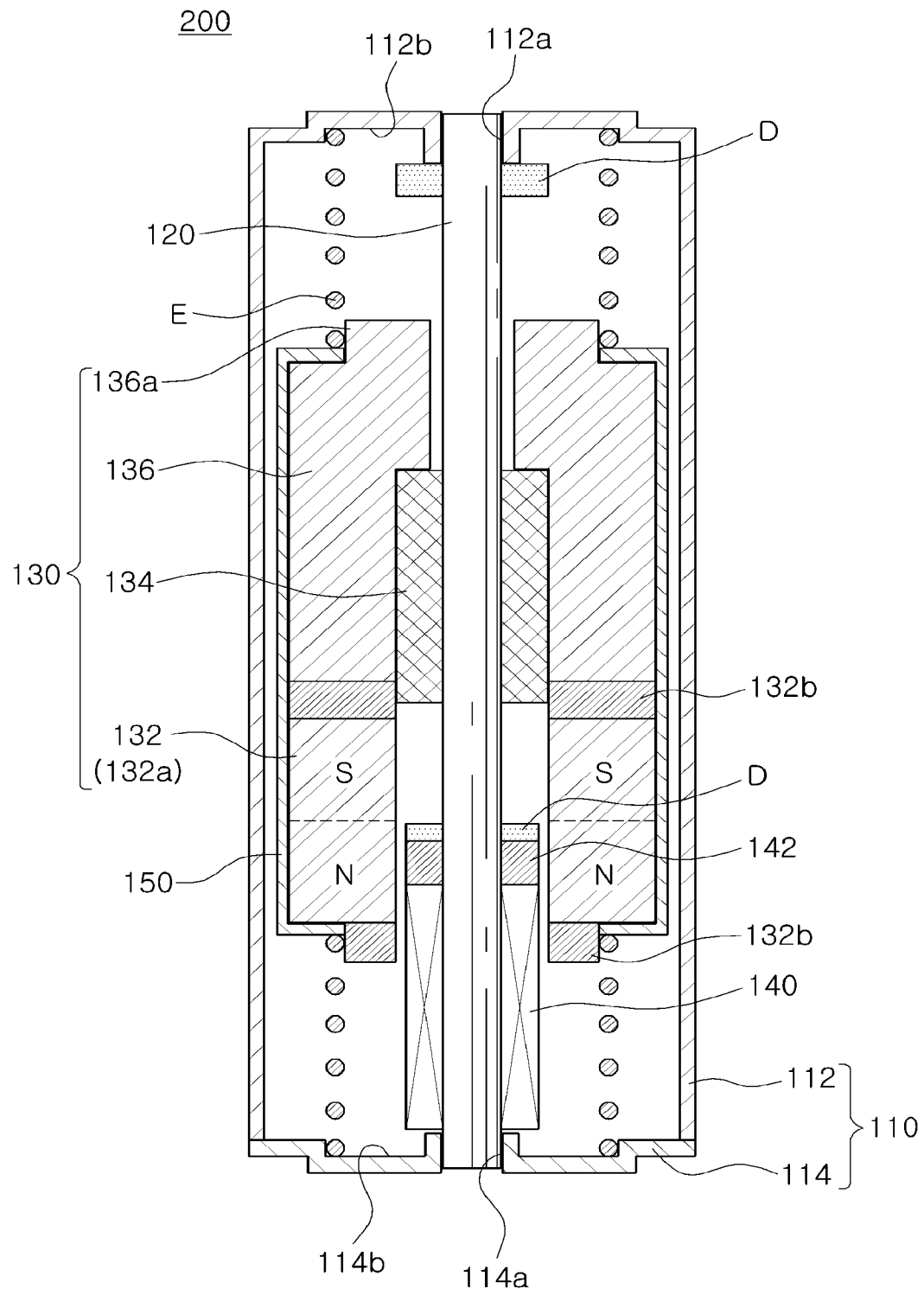
FIGS. 5 and 6 are cross-sectional views of vibrators according to other embodiments of the present invention.
Figure 6:
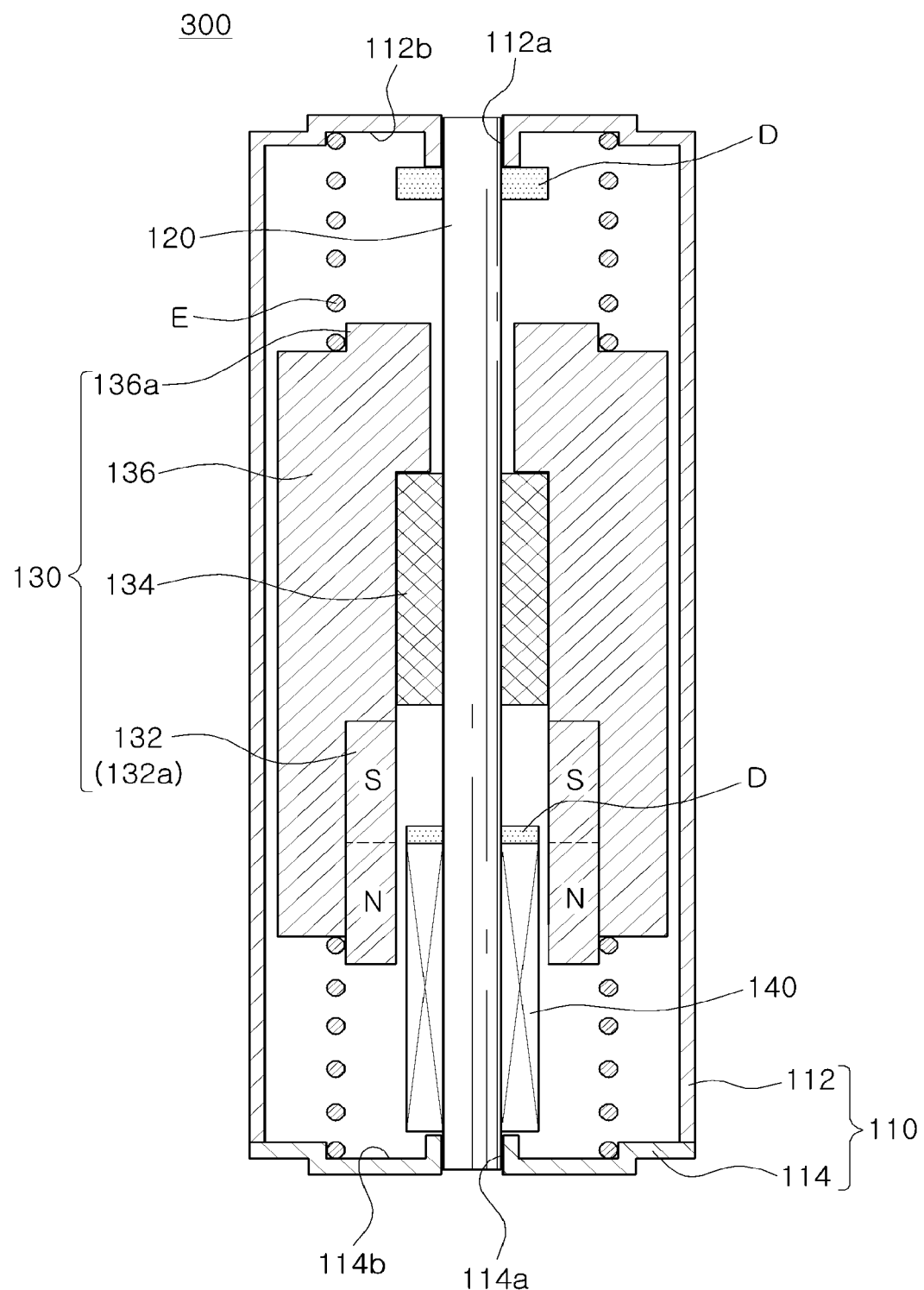

FIGS. 5 and 6 are cross-sectional views showing vibrators according to other embodiments of the invention.

Referring to FIG. 5, a vibrator 200 according to another embodiment of the invention may include the housing 110, the shaft 120, the vibrating part 130, the coil 140, and the vibrating part case 150. The above-mentioned elements are merely exemplary, and some of which may be removed or other elements may be additionally included.

Here, the vibrator 200 according to another embodiment of the invention is different from the vibrator 100 described with reference to FIGS. 1 through 4B, in that the vibrator 200 has a structure including yokes 132b and 142. Therefore, such different elements will be mainly described, and the same elements as those described with reference to FIGS. 1 through 4B will be understood based on the above descriptions.

Both ends of the magnet 132a in the length direction of the magnetic field part 132 provided in the vibrating part 130 of the vibrator 200 according to this embodiment of the invention may be provided with the yokes 132b formed of a magnetic material. The yokes 132b provided on both ends of the magnet 132a in the length direction thereof may have different sizes. In addition, the other end of the coil 140 having one end fitted into the guide part 114b of the bracket 114 may be fitted and fixed to one of the yokes 132b instead of the step fitting part 152 of the vibrating part case 150.

The magnet 132a may be provided with the yokes 132b such that electromagnetic force may be further increased.

Alternatively, the yokes 132b provided on both ends of the magnet 132a in the length direction thereof may have the same size or the yokes 132b may be provided on only one end of the magnet 132a in the length direction.

In addition, at least one of both ends of the coil 140 in the length direction may also be provided with the yoke 142 formed of a magnetic material. The yoke 142 may only be provided on one end of the coil 140. Alternatively, the yoke 142 may be provided on both ends of the coil 140.

The yoke 142 formed of the magnetic material may serve as a vibration stopping unit assisting in stopping vibrations of the vibrating part 130 through magnetic force between the yoke 142 and the magnetic field part 132 including the magnet 132a when an application of power to the coil 140 is stopped. That is, the generation of residual vibrations may be maximally suppressed and a stopping response speed of the vibrator 200 may be maximally increased.

Referring to FIG. 6, a vibrator 300 according to another embodiment of the invention may include the housing 110, the shaft 120, the vibrating part 130, and the coil 140. The above-mentioned elements are merely exemplary, and some of which may be removed or other elements may be additionally included.

Here, the vibrator 300 according to another embodiment of the invention is different from the vibrator 100 described with reference to FIGS. 1 through 4B, in that the vibrator 300 does not include the vibrating part case 150 enclosing the vibrating part 130. Therefore, such a different configuration will be mainly described, and the same elements as those described with reference to FIGS. 1 through 4B will be understood based on the above descriptions.

Since the vibrator 300 does not include the vibrating part case 150, the mass body 136 may also serve as a role of the vibrating part case 150. To this end, at least a portion of the magnetic field part 132 may be inserted into and coupled to one end of the mass body 136 while allowing the coil 140 to be disposed in the magnetic field part 132. Therefore, a relatively high level of vibrations may be implemented by increasing the weight of the mass body 136.

Figure 7:
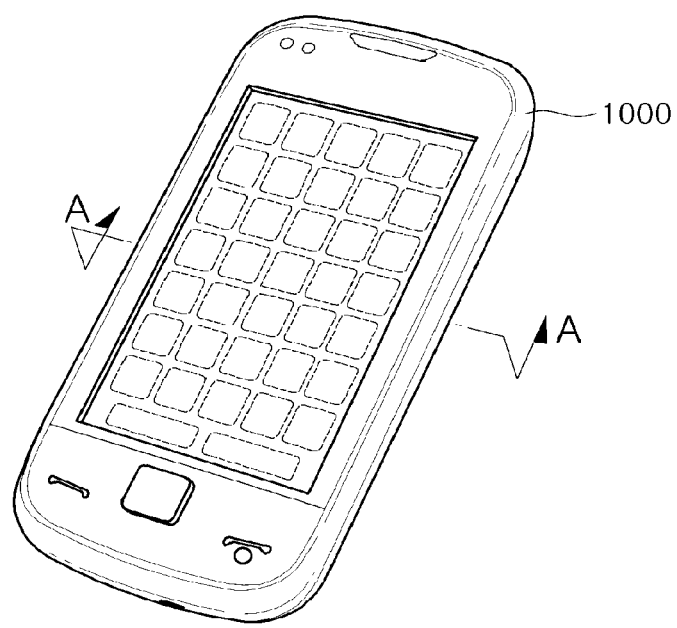
FIG. 7 is a schematic perspective view of an electronic device according to an embodiment of the present invention.
Figure 8:
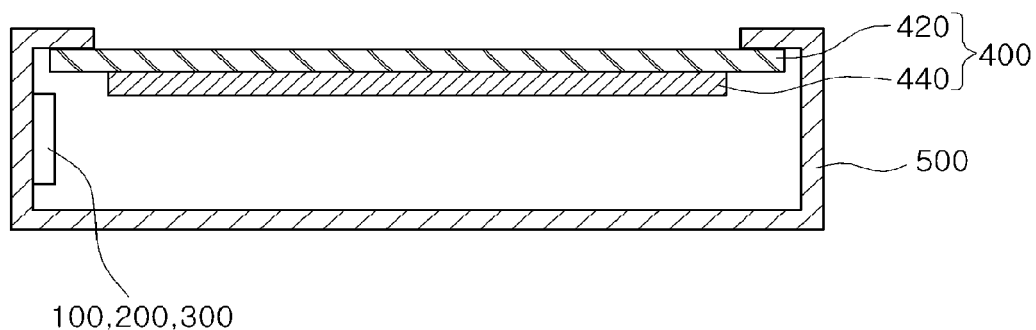
FIG. 8 is a schematic cross-sectional view of the electronic device according to the embodiment of the present invention.
Figure 9:
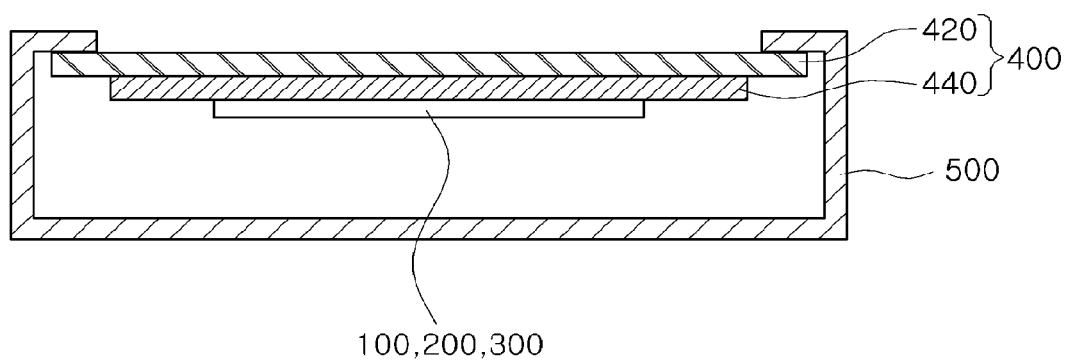
FIG. 9 is a schematic cross-sectional view of an electronic device according to another embodiment of the present invention.

Meanwhile, FIG. 7 is a schematic perspective view of an electronic device according to an embodiment of the present invention, FIG. 8 is a schematic cross-sectional view of the electronic device according to the embodiment of the present invention, and FIG. 9 is a schematic cross-sectional view of an electronic device according to another embodiment of the present invention. Referring to FIGS. 7 through 9, an electronic device 1000 may include a display module 400, a main body case 500, and the above-described vibrator 100, 200 or 300.

The display module 400 may display an image according to user selection. To this end, the display module 400 may be configured of a touch panel 420 providing a contact pressure of a user and a display panel 440 mounted on a lower surface of the touch panel 420 to thereby provide an image according to user selection, for example. However, the configuration of the display module 400 is not limited thereto, but any known configuration may be used as long as it may display the image according to user selection.

The main body case 500 may accommodate the display module 400. For example, the display module 400 may be accommodated in a front portion of the main body case 500. However, a location of the display module 400 within the main body case 500 is not particularly limited.

The vibrator 100, 200 or 300 may be mounted in the main body case 500, and may provide vibrations according to user selection. The vibrator 100, 200 or 300 may be located within the main body case 500 as shown in FIG. 8, and the vibrator 100, 200 or 300 may be mounted on a lower surface of the display panel 440 to directly provide vibrations to the display module 400. However, the location of the vibrator 100, 200 or 300 is not limited thereto, but the vibrator 100, 200 or 300 may be disposed in any location within the main body case 500 as long as it may provide vibrations according to user selection.

The detailed description of the configuration of the vibrator 100, 200 or 300 has been described above, and thus it will be omitted.

As set forth above, according to embodiments of the invention, a linear vibrator may be miniaturized by efficiently improving the arrangement of internal components.

Further, a linear vibrator, having high performance and providing strong vibrations, having excellent vibration response, and immediately stopping vibrations in the case in which a factor contributing to generation of vibrations is removed, may be provided.

In addition, a linear vibrator having a high degree of durability allowing for the protection of internal components from external impacts and satisfying requirements for high levels of productivity and low manufacturing costs may be provided.

While the present invention has been shown and described in connection with the embodiments, it will be apparent to those skilled in the art that modifications and variations can be made without departing from the spirit and scope of the invention as defined by the appended claims.

What is claimed is:

1. A vibrator, comprising:
    a housing having an internal space;
    a shaft included in the internal space;
    a vibrating part suspended in the internal space by elastic members at both ends thereof, including a magnetic field part, and having a bearing member slidably and movably installed on the shaft; and
    a coil generating vibrations of the vibrating part through electromagnetic interaction with the magnetic field part and provided on an outer peripheral surface of the shaft while facing the magnetic field part.

2. The vibrator of claim 1, wherein the vibrating part further includes a mass body.

3. The vibrator of claim 1, further comprising a vibrating part case enclosing the vibrating part.

4. The vibrator of claim 1, wherein the coil is disposed at one end of the shaft in a length direction thereof, and
    the magnetic field part is disposed at one end of the vibrating part so as to be associated with the coil.

5. The vibrator of claim 4, wherein the coil is disposed in the magnetic field part.

6. The vibrator of claim 5, wherein the magnetic field part has an inner diameter greater than an outer diameter of the coil.

7. The vibrator of claim 4, wherein at least one end of the coil in the length direction thereof is provided with a yoke formed of a magnetic material.

8. The vibrator of claim 4, wherein the magnetic field part includes a magnet.

9. The vibrator of claim 8, wherein at least one end of the magnet in a length direction thereof is provided with a yoke formed of a magnetic material.

10. An electronic device, comprising:
    a display module displaying an image according to user selection;
    a main body case accommodating the display module; and
    a vibrator mounted in the main body case and providing vibrations according to user selection by including a housing having an internal space, a shaft included in the internal space, a vibrating part suspended in the internal space by elastic members at both ends thereof, including a magnetic field part, and having a bearing member slidably and movably installed on the shaft, and a coil generating vibrations of the vibrating part through electromagnetic interaction with the magnetic field part and provided on an outer peripheral surface of the shaft while facing the magnetic field part.

* * * * *